US00RE35666E

United States Patent [19]

Smith

[11] E Patent Number: Re. 35,666

[45] Reissued Date of Patent: Nov. 25, 1997

[54] TILE SAW APPARATUS AND METHOD

[76] Inventor: Allen L. Smith, 80 S. 900 East #25, Provo, Utah 84606

[21] Appl. No.: 987,696

[22] Filed: Dec. 9, 1992

Related U.S. Patent Documents

Reissue of:

[64] Patent No.: 4,976,251
Issued: Dec. 11, 1990
Appl. No.: 372,861
Filed: Jun. 28, 1989

[51] Int. Cl.[6] ..... B24B 55/02; B26D 7/08; B28D 1/04

[52] U.S. Cl. ..... 125/13.01; 83/169; 451/450

[58] Field of Search ..... 125/13.01–13.02, 125/12, 14, 35; 83/169–171, 35, 92 R; 51/267, 102, 270, 272, 166 FB, 74 R, 238 R, 239; 451/450, 241, 453, 455, 361

[56] References Cited

U.S. PATENT DOCUMENTS

| | | | |
|---|---|---|---|
| 538,331 | 4/1895 | Hyde | 51/267 |
| 596,762 | 1/1898 | Sevison | 51/272 |
| 925,610 | 6/1909 | Sylvestre | 51/238 R |
| 1,824,000 | 9/1931 | Walter | 125/13.01 |
| 2,444,598 | 7/1948 | Eyles et al. | 125/13.01 |
| 2,557,251 | 6/1951 | Baker et al. | 125/13.01 |
| 2,562,246 | 7/1951 | Van Dam et al. | 51/239 |
| 3,090,615 | 5/1963 | May | 125/35 |
| 4,428,159 | 1/1984 | Sigetich et al. | 51/99 |

FOREIGN PATENT DOCUMENTS

| | | | |
|---|---|---|---|
| 2551113 | 5/1977 | Germany | 125/13.01 |
| 1308506 | 5/1987 | U.S.S.R. | 125/13.01 |

*Primary Examiner*—Robert A. Rose
*Attorney, Agent, or Firm*—Terry M. Crellin

[57] ABSTRACT

A tile saw having a liquid reservoir and a rotary saw blade protruding through a saw table, the rotary blade picking up liquid from said liquid reservoir as it rotates, the liquid being used to cool the rotary blade as it cuts, comprising a means for maintaining the circulation of liquid from the liquid reservoir to the rotary blade as it cuts and back to the reservoir with no significant splashing or loss of liquid, and means for cutting past the rotary blade without interfering with the maintained circulation of liquid which cools the rotary blade. The rotary blade protrudes through a thin slit in the saw table so that a tile is provided with support as it is cut, whereby precision cuts can be made to the tile.

10 Claims, 4 Drawing Sheets

TILE SAW APPARATUS AND METHOD

Matter enclosed in heavy brackets [ ] appears in the original patent but forms no part of this reissue specification; matter printed in italics indicates the additions made by reissue.

*CROSS REFERENCE TO RELATED APPLICATION*

*This application is a reissue of U.S. application Ser. No. 372,861, filed Jun. 28, 1989, now U.S. Pat. No. 4,976,251.*

BACKGROUND OF THE INVENTION

1. Field of the Invention

The present invention relates generally to tile and ceramic saws. More specifically the present invention relates to liquid cooled table tile saws.

2. Description of the Prior Art

The prior art is replete with water cooled saws for tiles and ceramics. None of these saws, however, are true table saws. There are primarily two shortcomings with the saws which cut tile. The first is that none of the saws are actually "table" saws, that allow large size tiles to be cut. The second is that prior art liquid cooled saws splash water on the operator and the surrounding environs.

Presently, few table saws exist which allow one to cut tile on a table saw in much the saw way as one cuts wood on a wood table saw. Most prior art tile saws have a slideable unit into which a tile is secured. The unit and tile are then slid into the blade. The major drawback to mounting units is that they cannot cut large tiles. Also, they are often cumbersome to use. Additionally, the sliding table bearings wear out and the devices become unsturdy. The reason a sliding table is used is that tile saws are water-cooled and covered blades with a sliding table retain water better than a flat saw table.

The second major drawback to prior art tile saws is that the water used to cool the saw blade is splashed off the saw table, getting the operator wet and necessitating clean up and possible repair of water damaged items. Because of the inability to obtain a tile saw which can cut tiles without creating a mess, tiles must be cut other than at the area at which they are being installed. Alternatively, a lengthy protection preparation or clean-up must be done. This adds considerably to the time required to lay tile. Also, the operator of the saw is adversely affected as a result of being hit by splashing water.

Referring to FIG. 1(a), U.S. Pat. No. 2,444,598, issued Jul. 6, 1948, discloses a water cooled saw. The saw 2 has a mounting unit for securing tiles as they are cut. Additionally, the blade picks up water from a water reservoir located under the saw table. The water is channelled through a vertical guide 4 which curves around depositing the water picked up by the saw blade 6 on to the blade at its cutting point. In this prior art configuration 2, a tile cannot be cut past the water guide 4 without turning the tile around. Also, large tiles could not be cut because the vertical guide 4 would prevent the tile being pushed past the saw. The blade 6 is not covered, therefore water will be shot on to the operator, the walls, etc. There is no water control, therefore, the configuration 2 would quite possibly have too much water, i.e., the blade 6 passing through and exhuming excessive amounts of water.

An additional shortcoming of this prior art device is that the ball-bearings of the slidable mounting unit wear out. This destroys the accuracy of the saw in a few years. The accuracy of a sliding table has plagued the tile industry for years. Thus, most of the changes in tile saws have been in the sliding tables.

These sliding tables additionally have slots (8 of FIG. 1b) which are too large to make precision cuts in a small amount of tile without the tile falling through or the operator undergoing great difficulty in supporting the piece of tile desired to be cut.

Another notable aspect of prior art saws is that those with a table saw arrangement are bulky and heavy. These heavy saws make portability extremely difficult and decrease the environments in which the saw may be used.

U.S. Pat. No. 2,743,717, issued May 1, 1956, discloses a lapidary saw for cutting stone. A casing encloses much of the saw blade. A mounting unit is provided for mounting stones.

U.S. Pat. No. 3,008,462, issued Nov. 14, 1961, discloses a processing saw for cutting and processing rich ore stone material. The saw has a curve guard covering it. Guards are also provided for stopping rock and stone chips. The saw is water cooled.

U.S. Pat. No. 3,103,922, issued Sept. 17, 1963, discloses a rock cutting apparatus comprising a receptacle beneath the blade containing a cooling emulsion.

U.S. Pat. No. 3,170,454, issued Feb. 23, 1965, discloses a tile and masonry saw comprising a tank positioned beneath the blade which contains coolant. No path is provided for delivering coolant to the blade where it cuts.

U.S. Pat. No. 4,080,952, issued Mar. 28, 1978, discloses a lapidary saw wherein a rotary blade has its bottom portion continuously immersed in coolant contained within a reservoir. The coolant is discharged upon blade rotation.

Thus, the prior art has used a rotary blade to cut tile. Also, the prior art has attempted to use a liquid to cool the blade as it cuts. The prior art, however, has not attempted to cool the blade with a contained and controllable amount of liquid. Additionally, the prior art has not attempted to achieve the ultimate goal of producing a genuine table tile saw which is capable of cutting large tiles in one cut, with the added benefit of a contained, controllable liquid cooling system and a precision cutting surface. Furthermore, the prior art has not addressed portability in a tile saw.

SUMMARY OF THE INVENTION

It is, therefore, an object of the invention to provide a table tile saw wherein the liquid is circulated within a contained path so that there is no substantial splashing of the liquid off the table tile saw.

It is another object of the invention to provide a table tile saw which has a planar table surface through which the saw protrudes, whereby large tiles can be cut in one pass over the protruding saw blades.

It is another object of the present invention to provide a portable table tile saw with a confined water path.

It is still another object of the invention to provide a table tile saw which provides a precision cutting surface.

The attainment of these and related objects may be achieved through use of the novel liquid cooled table tile saw disclosed herein. A liquid cooled table tile saw in accordance with this invention has a liquid cooling system including a rotary saw blade protruding through a saw table, the rotary blade picking up liquid from a liquid reservoir as it rotates The water picked up by the arm is delivered to the blade at its cutting point, without interfering with the passage of a tile through and past the blade.

The table saw blade is cooled by applying a circulating contained liquid to the rotary saw blade as it cuts, the contained liquid having a path of circulation beginning and ending in the liquid reservoir, whereby the blade is sufficiently cooled as it cuts with no substantial splashing of the contained water off the surface of the saw table, thereby eliminating extraneous splash protection. The table saw is made of light weight materials to promote portability.

DETAILED DESCRIPTION OF THE PREFERRED EMBODIMENT

The table tile saw of the preferred embodiment uses liquid to cool a rotating saw blade as it cuts tile. In the preferred embodiment the liquid chosen is water because of its low cost and availability. The saw is light weight and can be carried by a single person, which greatly facilitates its application. Since it operates as a table saw it is capable of cutting the large 12" by 12" and 18" by 18" tiles produced in the tile industry, even along the diagonal. Also, 24" by 24" tiles may be cut on the diagonal by turning the tile upside down half-way through the tile and reversing the tile to cut the other half.

Figure 1B:
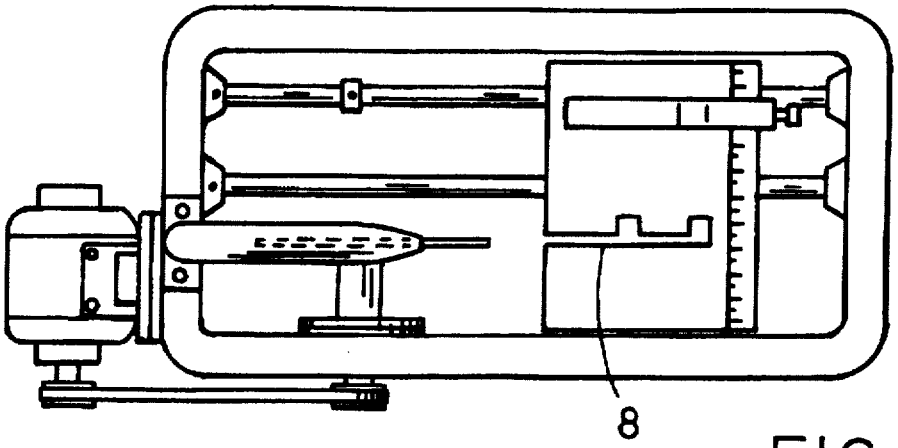
FIG. 1(b) is a top view of a tile saw of the prior art.
Figure 1A:
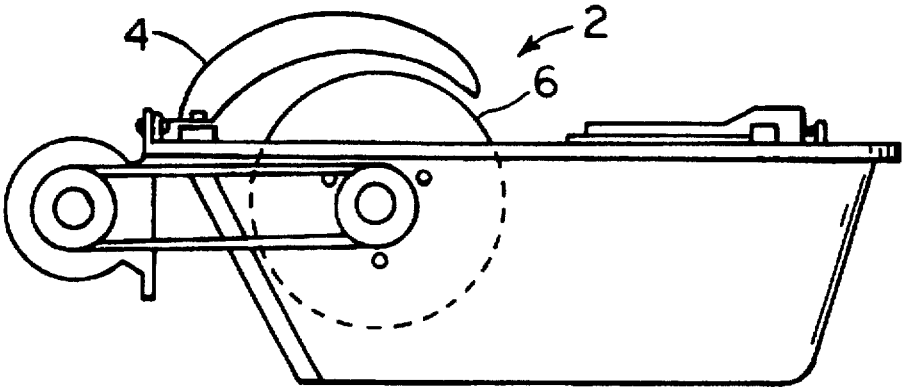
FIG. 1(a) is a side view of a tile saw of the prior art.
Figure 2:
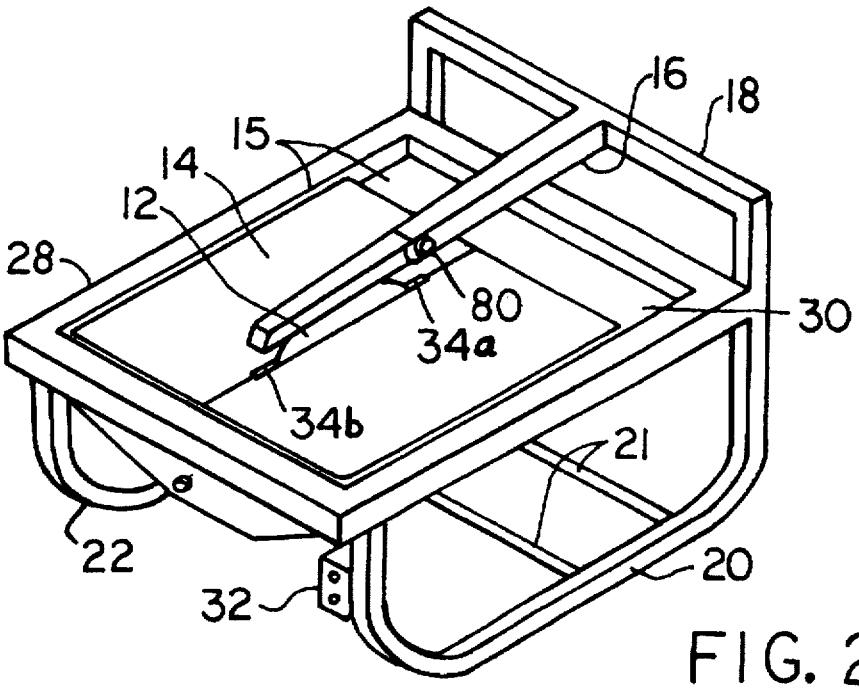
FIG. 2 is a perspective view of the table tile saw of the preferred embodiment.

Referring to FIG. 2, a perspective view of the table tile saw 10 is presented. The principal cutting mechanism of the saw 10 is a saw blade 12. The blade 12 protrudes through a planar table 14 at slit 34. A tile is slid across the table and placed in contact with the blade 12, whereupon it is cut. The angle of the cut is approximately 68 degrees. The blade is a standard circular diamond tile saw blade. In the preferred embodiment, an 8" diameter blade is used. 10 inch, 12 inch or other size blades could also be used, with appropriate changes. Above the blade 12 is the water guide arm 16. The water guide arm 16 collects water and channels it to the cutting portions of the saw blade 12. The water guide arm 16 is mounted to a mounting bar 18 that is secured to the upper portion of the legs 20 and 22, thereby forming a frame. By elevating the guide arm 16 above the saw table 14, a tile may be pushed past the tile saw blade 12, virtually making the cutting length infinite.

The table tile saw comprises a frame which supports the saw 10. First and second leg units 20 and 22 support the table 14 off the ground. A table frame 28, connected to the first and second leg units 20 and 22, rims the table 14. This frame 28 provides a warning zone and edge protection for the table 14. There is a gap between the table 14 and the table frame 28 through which the water reservoir 30 can be observed to check water level. The water reservoir 30 is made of ABS plastic to reduce weight. Alternatively, the reservoir could be made of fiberglass or a light weight metal. The ABX plastic material promotes ease in cleaning A utility outlet 32 is also provided, so that miscellaneous machinery may also be run off the saw.

Located centrally in the water guide arm 16 is a pivot 80. The pivot permits the guide arm 16 to be raised to permit the back cutting of tiles. The pivot is described in more detail with reference to FIG. 6. Having set forth the physical features of the saw 10, the water handling properties are described below.

Figure 3:
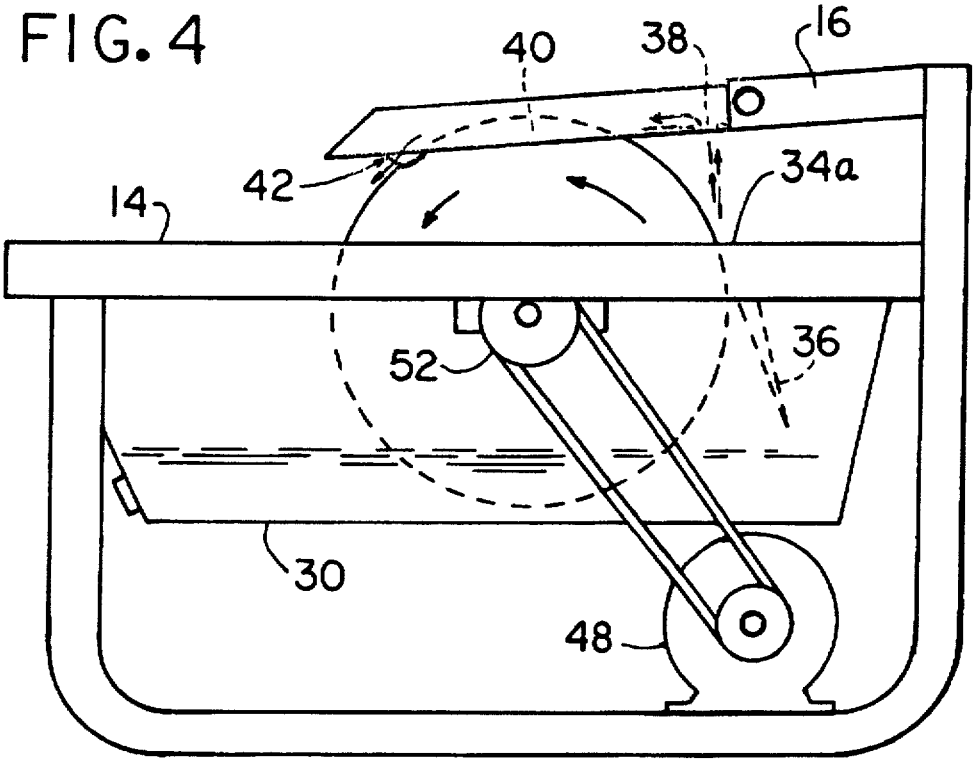
FIG. 3 is a side sectional view of the table tile saw of the preferred embodiment.

Referring to FIG. 3, a cross-sectional view of the table tile saw 10 is presented. In the table 14, the solid dark line represent the slit 34. It is through this slit 34 that the rotary saw blade passes. As is known, water may be extracted from a reservoir 30 by a rotating saw which passes therethrough. As the rotary saw 12 turns, it picks up water from the reservoir 30 (in the teeth of the saw 12) and thrusts it upward towards the table. The thrust is so significant that in prior art saws the water from the reservoir was completely extracted and splashed about the environs of the saw.

The water confinement mechanism of the table tile saw 10 has a plurality of functional parts. The first of these is the water baffle 36. The water baffle 36 provides an initial block which retains a significant portion of the water in the reservoir and directs the small portion, not blocked, vertically upward toward the slit 34. Only water which is directed substantially upward toward the table 14 is passed by the baffle 36.

A second and more crucial part of the water confinement mechanism is the slit 34a. Slit 34a refers to that portion of the slit 34 which is not occupied by the saw blade 12, at the point where the saw rotates out from the table 14. Of that portion of water which passes vertically past the water baffle 36, only a smaller sub-portion is directed toward the slit 34a. The slit 34a channels this portion to the water guide arm 16. The slit 34a (also shown is FIG. 2) is slightly larger than the saw blade 12. Therefore, as a tile is pushed passed the saw blade 12, the slit 34a is not obstructed by the tile. Thus, the water path is uninterrupted and water may continually be applied to cool the saw blade 12 as the tile is being cut.

Figure 4:
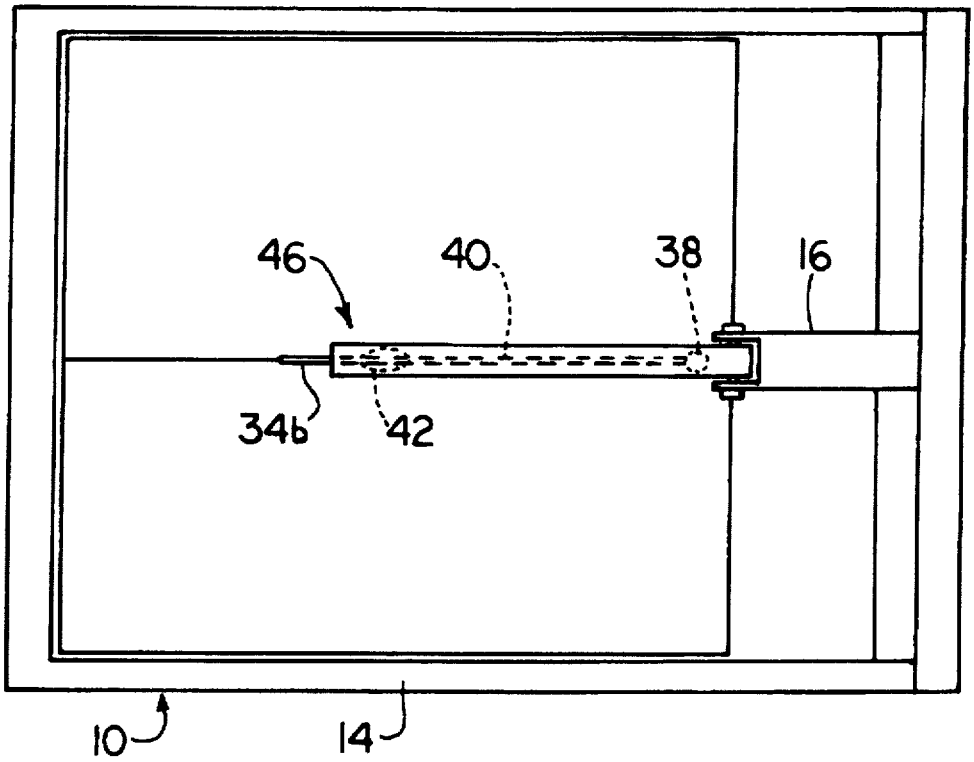
FIG. 4 is a top view of the table tile saw of the preferred embodiment.

A third part of the water containment mechanism is the collection hole 38 in the water guide arm 16 (the collection hole 38 is also illustrated in FIG. 4). The collection hole 38 serves to collect water which is passed through the slit 34a. The water thrusting vertically upward from the slit 34a enters the guide arm 16 at the collection hole 38. The slit 34a and collection hole 38 are configured to provide maximum confinement of the water path. Since the water guide arm 16 slopes diagonally downward toward the cutting region of the rotary saw, once water has entered the water guide arm 16, it flows toward the cutting region where the rotary saw 12 reenters the table 14. An additional feature of the water guide arm 16 is that mist created by the water being thrust through the slit 34a accumulates on the planar underneath portion of the guide arm 16 mist may also pass through a slit 40 in the guide arm 16. As the accumulations grow, they gradually move down the arm 16, under the force of gravity, until they reach the drop spot 42.

A fourth part of the water containment mechanism is the blade slot 40 in the water guide arm 16. The blade slot 40 performs two functions. The first is that water which has remained on the diamond teeth of the rotary saw blade as it rises to the vertical point of its rotation is collected inside the water arm guide 16. Thereby, the operator is protected from the spray, while simultaneously excess water from the blade 12 is collected. The second function of the blade slot 40 and its corresponding underneath portion of the water guide arm 16 is to accumulate excess water which did not enter the blade slot 40. Excess water from mist or direct splash is accumulated on this underneath portion of the water guide arm 16 and flows through the force of gravity to the depressed region 42.

A fifth functional part of the water containment mechanism is the depressed region 42. The depressed region 42 is actually comprised of a depression (at the lowest point of the guide arm 16) and slit 40. The depressed region 42 is such that the water which has accumulated and flowed down the water guide arm 16 drips off at the depressed region 42. The depressed region 42 serves to focus the accumulated water so that it falls on a specific point on the rotating saw blade 12. The depressed region 46 also corresponds with the slit 40. The slit runs to the end of the depressed region 42 so that all water accumulated in the arm 16 may fall at the region 42. Water which has been collected in the water guide arm 16 flows down the guide arm 16 to its end at the depressed region 42. The depressed region 42 assures, through the force of gravity, that water in the guide 16 flows to where it is desired (onto the saw blade 12). The slit 40 is positioned directly over the rotating saw blade 12. Water from the slit 40 falls on the blade 12, cooling it as it cuts.

The level of water cooling the blade may be adjusted by adjusting the level of water in the reservoir 30, through which the rotating saw blade 12 passes. If more water is required to cool the saw blade, the water level in the reservoir 30 is increased If less water is desired, the water level in the reservoir 30 is lowered.

As water falls from the slit 40, it is directed onto the saw blade 12 and back toward the slit 34. This involves a sixth functional part of the water containment mechanism. A slit 34b is provided in the table 14 at the point where the teeth of the rotary saw blade 12 re-enter the table 14. The slit 34b is a continuation of slot 34 and is located on the opposite side of the rotary saw blade 12 as slit 34a. Slit 34b is a drainage slit for the water that has fallen from the drop spot 42 or been carried from the reservoir 30 in the diamond teeth of the saw blade 12. The combination of the confined water path and the configuration of slit 34b provide virtually splashless operation, whereby the water extracted by the saw blade 12 is returned to the reservoir with little, if any, loss. In general, water is "carried" by the saw blade through slit 34 back into the reservoir 30. As the tile is cut, the water cooling the blade is pushed through slits 34b and 34 and downward towards the water reservoir 30. Accumulations of water on the table 14 are drained by the slit 34b. Slit 34b is not the only drainage mechanism, the length of slit 34 may also provide drainage. Thus, through slit 34b and 34, the water extracted by the rotary saw blade 12 and passes through the slit 34a, is returned to the reservoir 30 for recirculation. Additionally, a slit 15 is provided around the table 14 to facilitate recirculation of water that has splashed onto the table 14.

The saw blade 12 is driven by an electrical motor 48. The motor 48 is one half horsepower and turns at a rate of 1725 rpms. The motor 48, through belt 50 turns the saw blade 12 at 2250 rpms. A suitable motor, is made by Grainger Corporation of Salt Lake City, Utah. The motor 48 is attached to motor mounts 21 (FIG. 2) welded across the leg units 20 and 22. A belt 50 is used to drive the saw blade 12 which is attached to a blade mount 52.

Referring to FIG. 4, a top view of the table tile saw 10 is presented. The water guide arm 16 extends over the table 14. Three of the functional aspects of the water containment mechanism, which are located on the bottom of guide arm 16 are illustrated by dotted or dashed lines. The collection hole 38 is represented as a dashed circle. This is to represent that it has been cut away. With a guide arm 16 of about 1 inch in width, the collection hole 38 is approximately ⅜ inch in diameter.

The blade slot 40 is represented by a dashed line. The slot 40 runs from the hole 38 to the depressed region 42 (illustrated by dotted lines). The saw blade 12 passes through this slot 40 as described above with reference to FIG. 3. The depressed region 42 forces the accumulated water external to the guide arm 16 and the collected water internal to the guide arm 16 to fall on the rotating saw blade 12. As water congregates, due to the depression, it falls out of the slit 40 and onto the blade 12, cooling it as it cuts tile. This water is collected by the slit 34b and returns to the reservoir 30.

In addition to providing a confined water flow, the table tile saw is light weight, thereby promoting portability. It greatly increases the ease of cutting and laying tile because, it operates without splashing water off the surface of the table. Therefore, it can be operated in a room in a residential home, e.g., while a new bathroom floor is being installed, without damaging the dry wall or surrounding environs and without causing significant clean up.

Another significant feature of the preferred embodiment is that the slit 34 is so narrow, just enough for the blade 12, that close precision cutting may be achieved. Since the slit 34 is so small, the area of support is large for a tile. The added support so close to the blade enables precision cutting of tiles and tile fragments. These cuts have been unachievable because prior art devices caused tiles to crack due to the stress of cutting coupled with the lack of support underneath.

An additional feature of the table tile saw 10 is that its 68 degree cut angle and the absence of a movable tile unit allows for back-cuts and minute movement. The saw is also capable of sideways cuts when a diamond blade is used.

Referring to FIG. 5a–f, the fence gauge 60 of the present invention is displayed. The fence gauge 60 is used to guide tile through the blade 12. A tension spring 66 allows the gauge 60 to clip on to the saw 10. Thumbscrews 62 and 64 are used to adjust the gauge to the saw table 14.

Figure 5A:
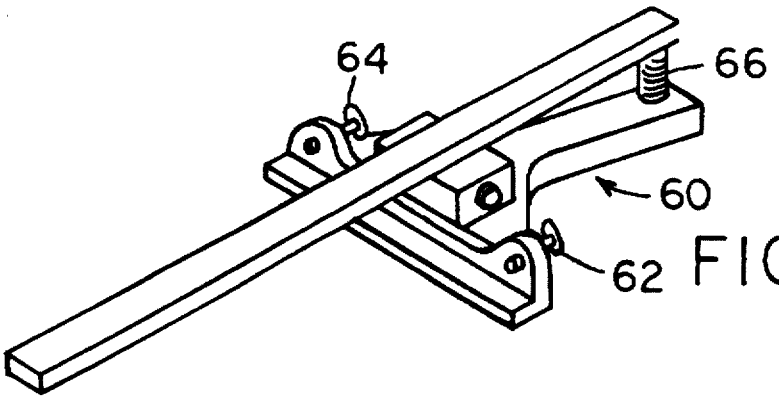
FIGS. 5a–f are illustrations of fence gauge mechanisms of the preferred embodiment.
Figure 5C:
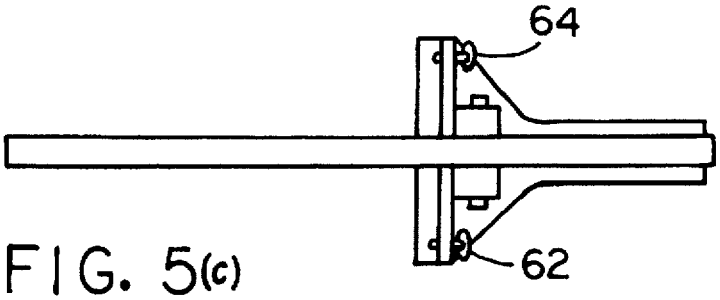
Figure 5B:
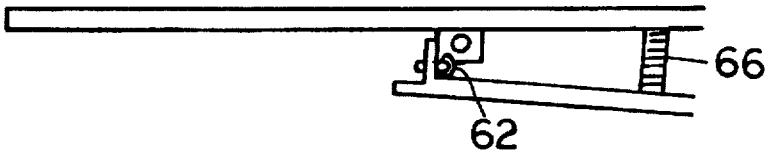
Figure 5D:
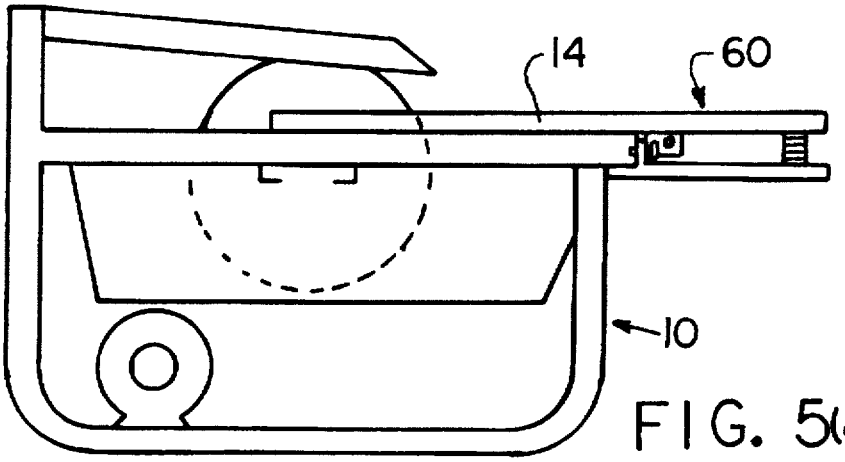
Figure 5F:
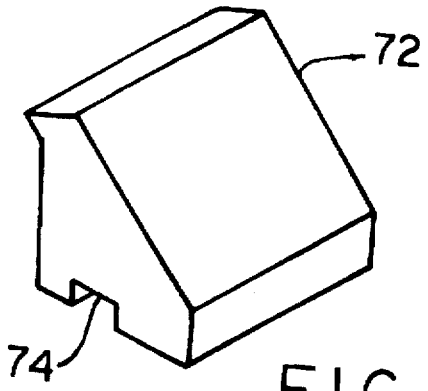
Figure 5E:
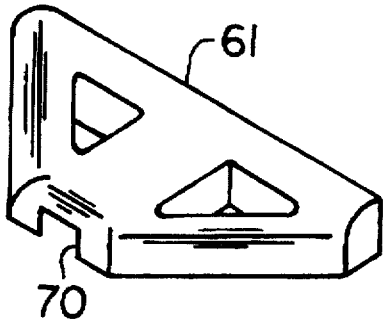

In FIG. 5e, a diagonal gauge 68 is illustrated. Opening 70 permits the gauge 68 to fit over the fence gauge 60 allowing diagonal cutting. In FIG. 5f, 45° angle gauge 72 is shown. Similarly, it has an opening 74 which fits over fence gauge 60 to permit 45° angle cuts.

Figure 6:
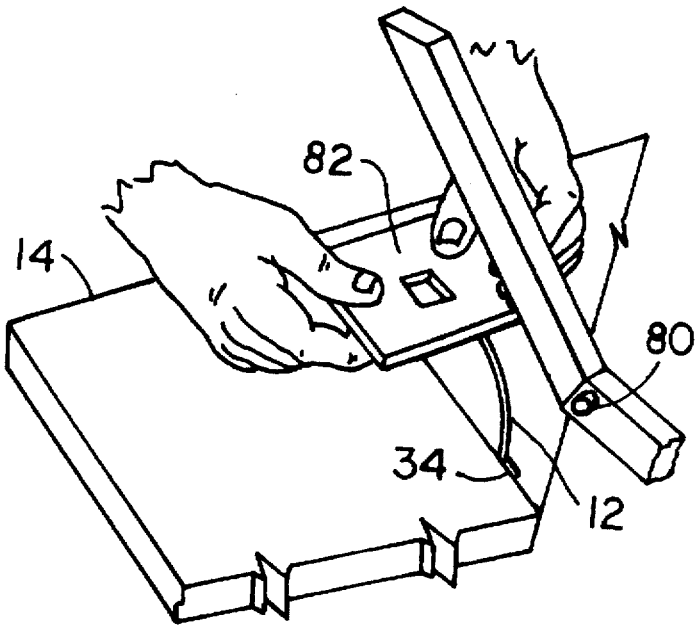
FIG. 6 a water guide arm having a pivot therein.

Referring to FIG. 6, a water guide arm 16 is shown with a pivot 80. The pivot 80 permits the arm 16 to be raised upward on a 45° angle to permit back cutting of a tile 82. The pivot is 12" from the front of the arm 16. In this arrangement, the water guide arm 16 is rigidly fixed to the mounting bar (18 of FIG. 2).

It should further be apparent to those skilled in the art that various changes in form and details of the invention as shown and described may be made. It is intended that such changes be included within the spirit and scope of the claims appended hereto.

What is claimed is:

1. A portable table tile saw having a liquid reservoir, comprising:

a saw table connected to and located above said liquid reservoir;

a rotary saw blade protruding through a centralized saw blade slot in said saw table, said rotary saw blade picking up liquid from said liquid reservoir as said rotary saw blade rotates, said picked up liquid being used to cool said rotary saw blade as said rotary blade cuts tile; and hollow arm means located above said rotary saw blade and connected to said saw table for shielding an operator and for cooperating with said saw table for precisely controlling the amount of liquid utilized by said rotary saw blade;

wherein said saw table and arm means comprise a plurality of liquid controlling measures;

said saw table including a slit means located therein and positioned in line with and directly behind said rotary saw blade such that said slit is an extension of said saw blade slot, said slit being configured to pass only a substantially upwardly directed portion of said picked up liquid through said table said slit means further being approximately as narrow as said rotary saw blade so that a tile may be pushed past said rotary saw blade without affecting said liquid passed upward through said slit means in said saw table;

said hollow arm means including a receiving opening located directly above said slit means for receiving said liquid passed upward through said slit means in said saw table so that liquid received at said receiving opening enters said hollow arm means;

said arm means further comprising a planar bottom portion having a blade slit therein said blade slit originating at said receiving opening which is also located in said planar bottom portion and positioned to envelope a top portion of said rotary saw blade, said planar bottom portion accumulating liquid mist, said liquid mist accumulations and said liquid which has entered said arm means through said arm slit and said receiving opening moving under the force of gravity to a dispensing means also located in said bottom of said arm means, said rotary saw blade rotating through said arm slit and being covered by said arm means so that liquid carried by said rotary saw blade into said arm slit during rotation is contained within said arm means and flows to said dispensing means;

said dispensing means forming a terminus of said blade slit opposite said receiving opening and being configured as a depression having said terminus therein so that liquid in said arm means and liquid mist accumulations on said planar bottom portion of said arm means which have moved to said dispensing means under the force of gravity fall therefrom onto said rotary saw blade approximately where said rotary saw blade cuts a tile;

said saw table further comprising a collection slit proximite to where said rotary saw blade cuts a tile for returning liquid through said saw table to said liquid reservoir.

2. The portable table tile saw of claim 1 wherein said saw blade slot is only wide enough to house said rotary saw blade and allow liquid drainage so that said tile is provided with maximum support as said tile is cut, whereby precision cuts can be made to said tile.

3. The tile saw of claim 1 wherein said saw table further comprises a peripheral slit means surrounding said saw table for returning excess liquid to said liquid reservoir.

4. The tile saw of claim 1 wherein said tile saw further comprises baffle means located over said liquid reservoir in close proximity to where said rotary saw blade picks up liquid from said liquid reservoir for retaining liquid in said reservoir except for that portion passing substantially vertically upward.

5. The tile saw of claim 1 wherein said arm means comprises a pivot means so that said arm means can be raised to permit back cutting of a tile.

6. A portable table tile saw having a liquid reservoir and a rotary saw blade protruding through a saw blade slot in a table, said rotary saw blade picking up liquid from said liquid reservoir as said rotary saw blade rotates, said liquid being used to cool said rotary saw blade as said rotary saw blade cuts a tile, and further comprising:

hollow arm means located above said rotary saw blade and connected to said saw table for shielding an operator and for cooperating with said saw table for precisely controlling the amount of liquid utilized by said rotary saw blade;

wherein said saw table and arm means comprise a plurality of liquid controlling measures;

said saw table including a slit means located therein and positioned in line with said rotary saw blade such that said slit means is an extension of said saw blade slot, said slit means being configured to pass only a small portion of said picked up liquid, said small portion being that portion of said picked up liquid that is directed substantially upward, said slit means further being approximately as narrow as said rotary saw blade and located directly therebehind so that a tile may be pushed past said rotary saw blade without affecting said liquid passed upward through said slit means in said saw table;

said hollow arm means including a receiving means located above said slit means and configured to receive said liquid which has passed through said slit means so that said received liquid enters said hollow arm means, said arm means further comprising a planar portion having an arm slit therein forming the bottom portion of said arm means, said arm slit originating at said receiving means and positioned so that said rotary saw blade enters said arm slit, thereby carrying liquid on said rotary saw blade into said arm means, said planar portion accumulating liquid mist, said liquid mist accumulations and said liquid which has entered said arm means through said arm slit and said receiving means moving under the force of gravity to a dispensing means also located in said arm means, said rotary saw blade rotating through said arm slit and being covered by said arm means so that liquid carried by said rotary saw blade into said arm slit during rotation is contained within said arm means and flows to said dispensing means;

said dispensing means forming a terminus of said arm slit and configured as a depression at said arm slit terminus such that liquid in said arm means and liquid accumulations on said planar bottom portion of said arm means which have moved to said dispensing means under the force of gravity fall therefrom onto said rotary saw blade approximately where said rotary saw blade cuts a tile.

7. The apparatus of claim 6 wherein said rotary saw blade cuts said tile at approximately 68 degrees.

8. The table tile saw of claim 6 further comprises a collection slit in line with and adjacent to said rotary saw blade at a location proximate where said liquid is dispensed onto said rotary saw blade for returning liquid through said saw table to said liquid reservoir.

*9. A portable table tile saw having a liquid reservoir, comprising:*

*a saw table having a perimeter edge;*

*a rotary saw blade protruding through said saw table, said rotary saw blade picking up liquid from said liquid reservoir as said rotary saw blade rotates, said picked up liquid being used to cool said rotary saw blade as said rotary blade cuts tile;*

*means for confining the circulation of liquid from the liquid reservoir to said rotary blade as it cuts and back*

*to said reservoir with no significant splashing of said liquid from said table tile saw;*

*said confining means configured for permitting uninhibited cutting of a tile of any length past said rotary saw blade, said tile cutting not interfering with the confined circulation of liquid which cools the rotary blade;*

*a fence gauge having an elongate guide member to guide tile through the blade; and*

*means for clipping the fence gauge to the perimeter edge of said saw table so that said elongate guide member extends inwardly from any selected position that the fence gauge is clipped to said perimeter edge of said saw table, wherein the means for clipping the fence gauge to the perimeter edge of said saw table comprises*

*a bracket which is pivotally attached to said elongate guide member, with the bracket making engagement with the lower side of the perimeter edge of said saw table;*

*spring means that exert a biasing force to grip the perimeter edge of said saw table between the bracket and said guide member to hold the guide member in a secure position on the saw table, with said spring means being manually manipulated to move the bracket against the biasing force and release the grip on the perimeter edge of said saw table so that said fence gauge can be moved to another desired position along the perimeter edge of said saw table;*

*said bracket has an extension that extends away from said perimeter edge of said saw table;*

*said elongate guide member has an extension that extends from the pivotal attachment to said bracket in a direction away from said perimeter edge of said saw table so as to be spaced from and superimposed above the extension on said bracket; and*

*said spring means is positioned between the extensions on said guide member and said bracket.*

*10. The portable tile saw of claim 9 wherein*

*said bracket has an elongate member that makes engagement with the lower side of the perimeter edge of said saw table and an upwardly standing lip that extends from said elongate member so that the lip is positioned adjacent to the outer side wall of said perimeter edge of said saw table; and*

*a pair of thumbscrews are located at opposite end portions of said elongate member to fine adjust the fence gauge relative to the perimeter edge of said saw table.*

* * * * *